(12) United States Patent
Ayash et al.

(10) Patent No.: US 11,829,671 B2
(45) Date of Patent: Nov. 28, 2023

(54) TRANSFER OF PRINT QUEUES VIA MACHINE READABLE CODES

(71) Applicant: Xerox Corporation, Norwalk, CT (US)

(72) Inventors: Barry K. Ayash, Webster, NY (US); Christopher W. Wend, Rochester, NY (US); Mark A. Rule, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/655,326

(22) Filed: Mar. 17, 2022

(65) Prior Publication Data

US 2023/0297305 A1 Sep. 21, 2023

(51) Int. Cl.
G06F 3/12 (2006.01)
H04N 1/00 (2006.01)
H04N 1/32 (2006.01)

(52) U.S. Cl.
CPC ............ G06F 3/126 (2013.01); G06F 3/1205 (2013.01); G06F 3/1258 (2013.01); H04N 1/00334 (2013.01); H04N 1/32128 (2013.01); H04N 2201/3269 (2013.01)

(58) Field of Classification Search
CPC ...... G06F 3/126; G06F 3/1205; G06F 3/1258; H04N 1/00334; H04N 1/32128; H04N 2201/3269
See application file for complete search history.

(56) References Cited

U.S. PATENT DOCUMENTS

| | | | |
|---|---|---|---|
| 2007/0019215 A1* | 1/2007 | Yu | H04N 1/32106 358/1.3 |
| 2013/0169996 A1* | 7/2013 | McLeod | G06F 11/0733 358/3.28 |
| 2014/0220168 A1* | 8/2014 | Perez | B29C 37/0007 425/161 |
| 2014/0365587 A1* | 12/2014 | Hayano | G06Q 10/107 709/206 |
| 2015/0294390 A1* | 10/2015 | Fan | G06Q 30/0633 705/26.4 |
| 2021/0096799 A1* | 4/2021 | Chew | G06F 3/1203 |
| 2021/0157532 A1* | 5/2021 | Takenaka | G06F 3/1259 |
| 2023/0254432 A1* | 8/2023 | Kusumoto | H04N 1/32106 241/101.2 |

OTHER PUBLICATIONS

ISO 11898-1:2015(E) Standard, 2015, pp. 1-74.

* cited by examiner

*Primary Examiner* — Iriana Cruz

(57) ABSTRACT

A printing device is disclosed. For example, the printing device includes a processor and a non-transitory computer readable medium storing instructions, which when executed by the processor, cause the processor to receive selections for settings of a print job, save the selections as a print queue, and generate a machine readable code that contains the selections for the print queue.

19 Claims, 4 Drawing Sheets

TRANSFER OF PRINT QUEUES VIA MACHINE READABLE CODES

The present disclosure relates generally to multi-function devices and relates more particularly to transferring print queues via machine readable codes.

BACKGROUND

Printers are devices that can perform a variety of different functions. The printers can provide a variety of different options to perform various job requests, such as different colors, different paper sizes, changing a print quality, changing a size of an image and/or text to be printed, stapling, collating, providing different email addresses, selecting which network storage service to send a scanned document to, and the like.

Different settings can affect the way a printed image appears. In addition, different settings on different types of printers may affect the way the printed image appears differently. Selecting the various settings for each print job on different printers can be cumbersome and time consuming.

SUMMARY

According to aspects illustrated herein, there are provided a printing device and a method for generating a machine readable code for a print queue. One disclosed feature of the embodiments is a printing device that comprises a processor and a non-transitory computer readable medium storing instructions, which when executed by the processor, cause the processor to receive selections for settings of a print job, save the selections as a print queue, and generate a machine readable code that contains the selections for the print queue.

Another disclosed feature is a method for generating a machine readable code for a print queue. The method executed by a processor of the printing device comprises receiving selections for settings of a print job, saving the selections as a print queue, and generating a machine readable code that contains the selections for the print queue.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses printing devices that can generate machine readable codes to transfer print queues to another printer. As discussed above, printers are devices that can perform a variety of different functions. The printers can provide a variety of different options to perform various job requests, such as different colors, different paper sizes, changing a print quality, changing a size of an image and/or text to be printed, stapling, collating, providing different email addresses, selecting which network storage service to send a scanned document to, and the like.

Different settings can affect the way a printed image appears. In addition, different settings on different types of printers may affect the way the printed image appears differently. Selecting the various settings for each print job on different printers can be cumbersome and time consuming.

Some printers allow users to create a print queue. The print queue may store various settings for a print job for a particular type of substrate to ensure consistent image quality that is acceptable to a user. The print queue may be entered each time a user wants to execute a particular print job with desired settings. The print queue avoids requiring the user to re-enter the various parameters each time the user wants to execute a particular print job on the printer.

However, some businesses may have the same model printers located at various different locations. Or the manufacturer of the printers may have many customers that may be interested in similar settings for a print job. Previously, the business would have to go to each printer to create the print queue and manually select the various values for each desired print setting. Similarly, the manufacturer would have to provide the settings or go to the customer site to select the various settings for each print job. This procedure would be time consuming and have associated costs to re-enter the various values for each setting for a desired print job.

The present disclosure provides a machine readable code that can transfer the print queues. For example, for a particular type of printer, a user may select the various settings or values for a print job. Once the values and settings are selected to achieve a desired print image, the user may save the print queue, or a virtual print queue, and have the printer generate a machine readable code associated with the print queue.

The machine readable code may be a bar code, a quick response (QR) code, or any other type of machine readable code. The machine readable code may then be used to transfer the printer queue or virtual print queue to other printers. Thus, a user does not need to manually select the various settings or values for a particular print job. Rather, the user may simply scan the machine readable code at the printer, and the printer may automatically load the print queue. The user may then proceed with the desired print jobs with the loaded print queue.

Figure 1:
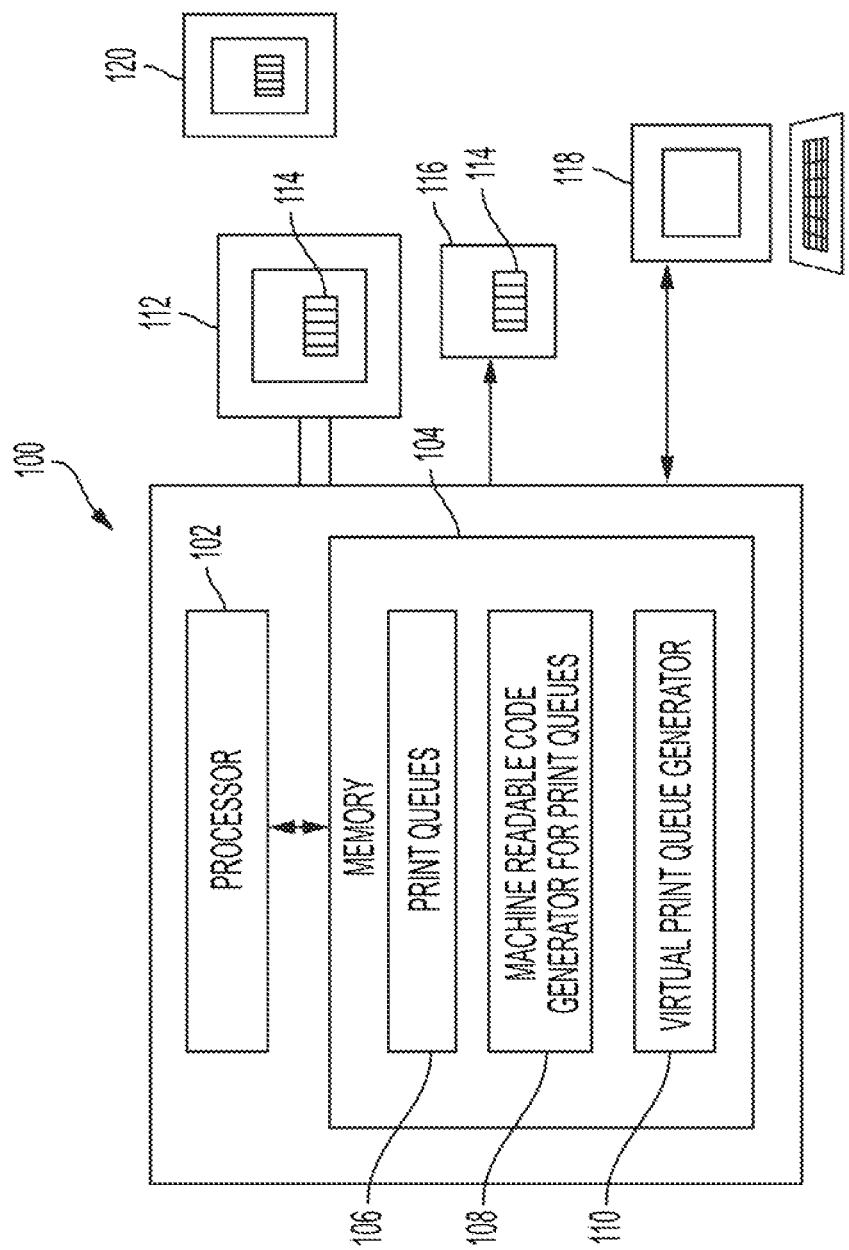
FIG. 1 illustrates a block diagram of an example printing device of the present disclosure.

FIG. 1 illustrates an example printing device 100 of the present disclosure. The printing device 100 may be a printer or a multi-function device (MFD) that has printing capability as well as other functions, such as scanning, copying, faxing, and the like.

It should be noted that the printing device 100 has been simplified for ease of explanation, but may include additional components that are not shown. For example, the printing device 100 may be capable of printing on different substrates and/or different sized substrates. The printing device 100 may include various paper trays to hold the various sized substrates.

The printing device 100 may also include various print heads or nozzles that can dispense different colored printing fluid. For example, the printing device 100 may dispense different colored printing fluid such as cyan, magenta, yellow, and black in various amounts to achieve various colors. As discussed in further detail below, the amounts of each color that are dispensed to achieve various colors can be part of the settings saved as part of the print queue or virtual print queue.

The printing device 100 may also include various paper paths, a digital front end (DFE), and finishing modules. For example, the printing device 100, may staple, collate, hole punch, and the like, documents that are printed.

In one embodiment, the printing device 100 may include a processor 102, a memory 104, and a display 112. The processor 102 may be communicatively coupled to the memory 104 and the display 112.

The memory 104 may be any type of non-transitory computer readable medium. For example, the memory 104 may be a hard disk drive, a solid state drive, a non-volatile memory express (NVMe) memory device, a random access memory (RAM), a read-only memory (ROM), and the like.

In one embodiment, the memory 104 may store print queues 106 (also referred to herein individually as a print queue 106), a machine readable code generator for print queues 108 (also referred to herein as a code generator 108), and a virtual print queue generator 110. In one embodiment, the memory 104 may also store instructions that are executed by the processor 102 to perform the functions described herein.

In one embodiment, the print queues 106 may also include virtual print queues that are generated via the virtual print queue generator 110. The print queues 106 may be generated by a user via a user interface shown on the display 112 or via an endpoint device 118 communicatively coupled to the printing device 100. For example, the endpoint device 118 may be a desktop computer, a laptop computer, a smart phone, and the like that can access the printing device 100 to generate a print queue 106 or to execute the virtual print queue generator 110 to generate a virtual print queue.

The endpoint device 118 may be connected to the printing device 100 via a wired or wireless connection. For example, the printing device 100 may be connected to the printing device 100 via an Ethernet connection, a WiFi connection, a Bluetooth connection, and the like.

In one embodiment, the print queue 106 may store various selections for settings of a print job. For example, users may spend time customizing various settings for a print job to obtain a desired image quality. The print queue 106 may include all available print queue properties for transfer using the methods described herein and may include any properties of future software versions, including spot or specialty colors or substrate types.

Some examples of the settings may include settings related to image quality (e.g., overprint, resolution, text enhancement, and the like), color management (e.g., rendering intent, halftone, source profile, and the like), image placement (e.g., rotation, scale, layout, and the like), stock (e.g., size, weight, color, type, and the like), and any other possible settings to print an image. The desired color may include specific cyan, magenta, yellow, and black or key (CYMK) values for each color or portion of an image that is printed. Values may be selected for the brightness, the contrast, an amount of zoom, and the like.

Once the settings are selected for a print job, the settings can be saved as a print queue 106 for a particular job. The print queue 106 may be saved with a name or identifier of the particular job.

The virtual print queue generator 110 may allow the endpoint device 118 to virtually create a virtual print queue. For example, the virtual print queue generator 110 may simulate the printed image based on various selections of settings. In other words, the virtual print queue generator 110 may allow a user to simultaneously try various settings to achieve the desired print image that could otherwise not be performed on a single printing device 100, or would have to be performed linearly in a time consuming manner.

After a print queue 106 or virtual print queue is generated and saved, the information associated with the print queue 106 may be provided to the code generator 108. The code generator 108 may take the selections for the various settings associated with the print queue 106 and generate a unique machine readable code 114 associated with the print queue 106.

The machine readable code 114 may be any type of machine readable code, such as a bar code, a quick response (QR) code, and the like. The machine readable code 114 may be presented to the user in a variety of different ways. For example, the machine readable code 114 may be shown on the display 114 to allow a user to capture an image of the machine readable code 114 via a smartphone or mobile device 120. The machine readable code 114 may be printed out on paper 116. For example, the QR code may be saved as an image file (e.g., a .jpg file) and printed out on the paper 116. The machine readable code 114 may be transmitted to the endpoint device 118 of a user, and so forth.

In one embodiment, the machine readable code 114 may be generated for a printing device 100 with a particular model number. For example, not all printing devices may have the same capabilities. Thus, the print queue 106 that is generated may be for printing devices of a particular model number. The machine readable code 114 may include information that indicates the model number or numbers that can use the print queue 106 saved in the machine readable code 114.

The machine readable code 114 may then be used to quickly transfer a particular print queue 106 or virtual print queue to another printing device 100. For example, rather than having to remember and manually re-enter all of the settings for a print queue 106, a user may take the machine readable code 114 to another printing device 100. The machine readable code 114 can be scanned or read by another printing device 100. The other printing device 100 may then translate the information in the machine readable code 114 into the selections for the various settings associated with a print job and automatically load all of the selections for the various settings on the other printing device 100. The other printing device 100 may then execute the print job with the loaded selections of the various settings associated with the print queue 106 obtained from the machine readable code 114.

Figure 2:
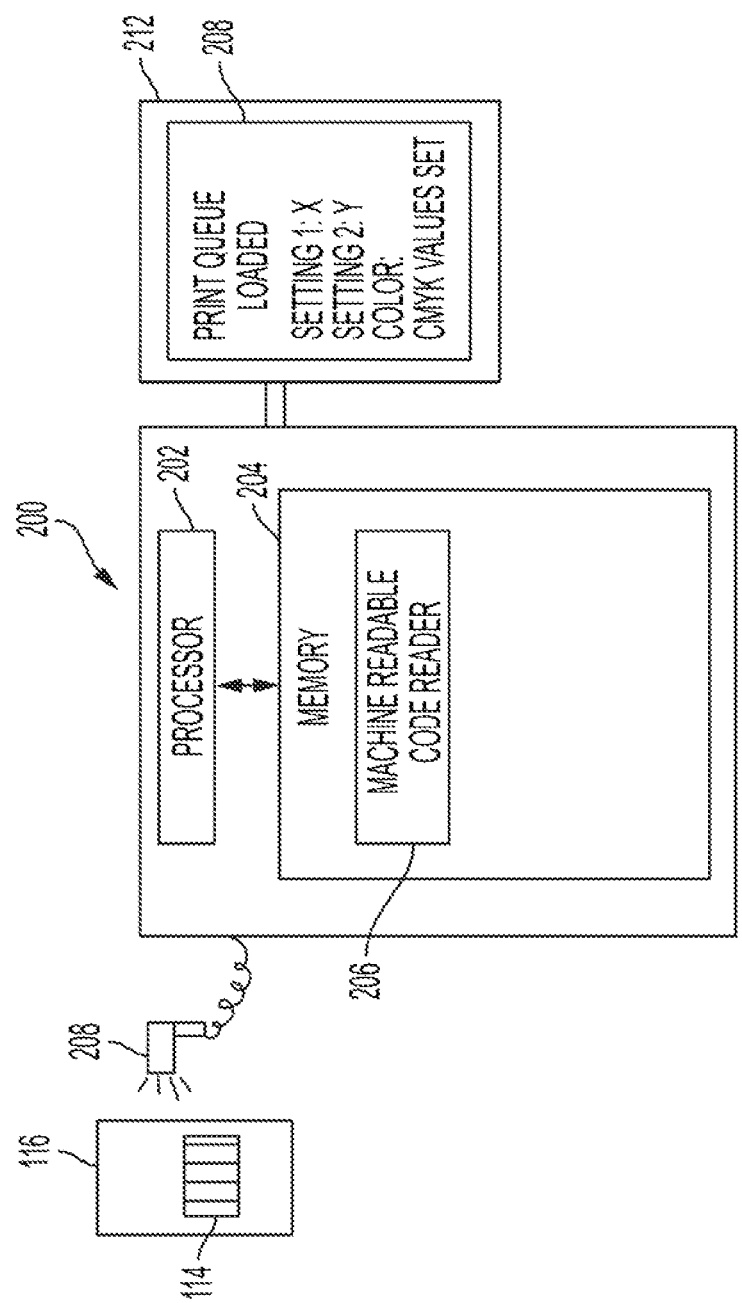
FIG. 2 illustrates an example of a machine readable code and how a print queue can be transferred using the machine readable code.

FIG. 2 illustrates an example of the machine readable code 114 and how a print queue 106 can be transferred using the machine readable code 114. In one embodiment, the machine readable code 114 may be taken to a printing device 200. The printing device 200 may be similar to the printing device 100 in all respects. In one embodiment, the printing device 200 may be the printing device 100 illustrated in FIG. 1.

In one embodiment, the printing device 200 may include a processor 202, a memory 204, and a code reading device 208 (also referred to as an optical scanner). The processor 202 may be communicatively coupled to the memory 204 and the code reading device 208.

The memory 204 may be any type of non-transitory computer readable medium. For example, the memory 204 may be a hard disk drive, a solid state drive, a non-volatile memory express (NVMe) memory device, a random access memory (RAM), a read-only memory (ROM), and the like.

In one embodiment, the memory 204 may store a machine readable code reader 206. In one embodiment, the memory 204 may also store instructions that are executed by the processor 202 to perform the functions described herein.

In one embodiment, a user may take the machine readable code 114 printed on the paper 116 to the printing device 200. However, as noted above, the machine readable code 114 may also be presented as an image on the mobile device 120 or the endpoint device 118. The user may scan the machine readable code 114 with the code reading device 208. The code reading device 208 may capture the machine readable code 114 and present the machine readable code 114 to the machine readable code reader 206.

In one embodiment, the machine readable code reader 206 may read the machine readable code 114 to translate the machine readable code 114 into the selections for various settings of a particular print queue 106. In one embodiment, the machine readable code reader 206 may first make sure that the model number of the printing device 200 matches the model number associated with the print queue 106 that is extracted from the machine readable code 114. As noted above, the print queue 106 may be for certain model numbers that have the same printing capabilities for customizable settings as the model number of the printing device 100 that generated the print queue 106. This step may be optional.

If the model number of the printing device 200 is capable of customizing all of the settings in the print queue 106 extracted from the machine readable code 114, the machine readable code reader 206 may extract the settings. For example, the machine readable code reader 206 may extract the CYMK values for a particular color setting, a paper selection, a paper size, a brightness level, a contrast level, a number of copies, and the like from the machine readable code 114.

In one embodiment, the various selections may be provided to the processor 202. The processor 202 may then automatically load the selections on the printing device 200. For example, the processor 202 may automatically go into the color selection menu and set the value for each CYMK color to generate the desired color. The processor 202 may go into the image quality menu and set the desired brightness level, contrast level, size adjustment, and the like. The processor 202 may go into the finishing options menu and select the various finishing options that were selected.

In one embodiment, after all of the selections are loaded by the processor 202, the processor 202 may show the loaded selections on a graphical user interface (GUI) 208 shown on a display 212 of the printing device 200. For example, the GUI 208 may provide a name of the print queue 106 that was extracted from the machine readable code 114. The GUI 208 may list all of the settings and the values or selections made for each setting. The user may verify the selections for each of the settings and then confirm the selections to execute a print job using the print queue that was loaded from the machine readable code 114.

Thus, a user may quickly take the print queue 106 to any printing device at any location that is capable of reading the machine readable code 114. The user may also share the print queue 106 quickly with other users by making copies of the paper 116 with the machine readable code 114 or transmitting a photo of the machine readable code 114 to other users. Thus, the print queue 106 or virtual print queue can be easily shared with other users or customers.

Although FIG. 2 illustrates an example where the machine readable code 114 is read via the code reading device 208, it should be noted that the machine readable code 114 may be transmitted to the printing device 200. For example, as noted above, a user may capture a photo of the machine readable code 114 via the mobile endpoint device 120 or the machine readable code 114 may be transmitted to the endpoint device 118 in an email as an attachment or an electronic file.

The mobile device 120 or the endpoint device 118 may transmit the electronic version of the machine readable code 114 directly to the printing device 200. The machine readable code reader 206 may then extract the information from the machine readable code 114 and provide the information to the processor 202. The processor 202 may then automatically load the print queue associated with the information extracted from the machine readable code 114, as described above.

Figure 3:
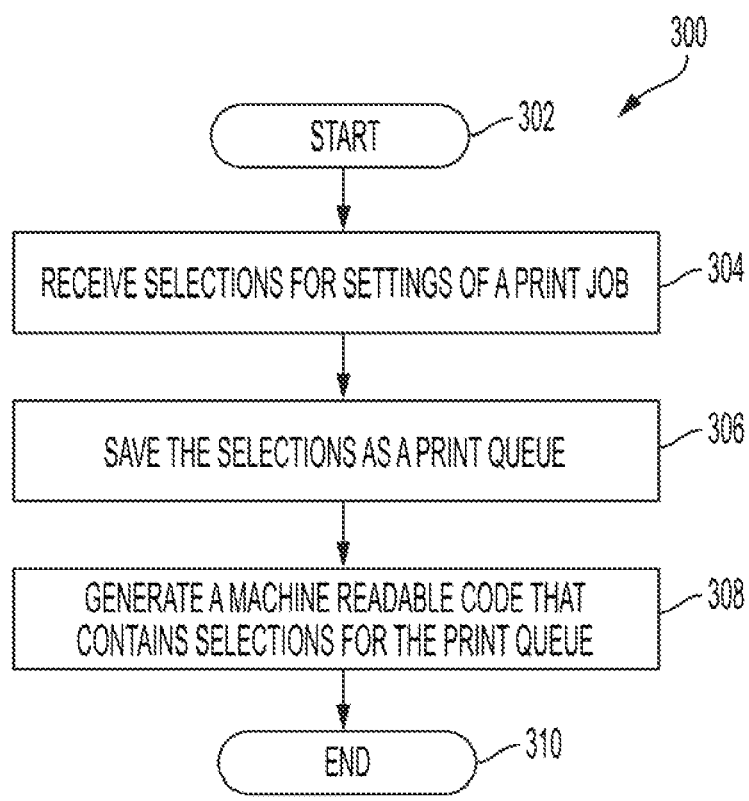
FIG. 3 illustrates a flow chart for a method of generating a machine readable code for a print queue of the present disclosure.

FIG. 3 illustrates a flow chart of an example method 300 for generating a machine readable code for a print queue of the present disclosure. In one embodiment, the method 300 may be performed by the apparatus 100 or by an apparatus such as the apparatus 400 illustrated in FIG. 4 and discussed below.

In one embodiment, the method 300 begins at block 302. At block 304, the method 300 receives selections for settings of a print job. For example, the selections may be for various print settings associated with a print job. For example, users may spend time customizing various settings for a print job to obtain a desired image quality. For example, the settings may include a paper size, a paper type, a desired color, a desired brightness, a desired contrast, a desired size adjustment, and the like. The desired color may include specific cyan, magenta, yellow, and black or key (CYMK) values for each color or portion of an image that is printed. Values may be selected for the brightness, the contrast, an amount of zoom, and the like At block 306, the method 300 saves the selections as a print queue. For example, the print queue may store all of the selections made for various settings that are customized by the user. The print queue may also be a virtual print queue that is generated via a virtual print queue generator, as described above. In one embodiment, the print queue may be associated with a particular model number of the printing device, as noted above.

At block 308, the method 300 generates a machine readable code that contains the selections for the print queue. For example, the selections for each of the settings that are customized may be provided to a machine readable code generator for print queues. The code generator may then generate a machine readable code that contains all of the customized settings for a particular print queue. As discussed above, the model number associated with the printing device that created the print queue may optionally be included in the machine readable code. The machine readable code may be a bar code, QR code, and the like.

The machine readable code may then be presented to a user. For example, the machine readable code may be presented as a print out on paper. In another example, the machine readable code may be shown on a display of the printing device to allow a user to capture an image of the machine readable code with a camera on a mobile device. In another example, the machine readable code can be transmitted to an endpoint device via an email or as an electronic file.

The machine readable code may then be used to automatically load the customized settings for a particular print queue onto another printing device. For example, the machine readable code may be read by an optical scanner or code reading device of another printing device. The other printing device may translate the machine readable code or extract from the machine readable code the selections for various settings associated with a print queue. The other printing device can then automatically set the selections on the other printing device for the print job using the selections from the print queue. In other words, the other printing device may automatically load the selections obtained from the print queue and then execute a print job in accordance with the print queue that is loaded.

If the user attempts to load the machine readable code onto a printing device with a different model number that does not include all of the customizable settings in the print queue, the printing device may provide an error message to the user. For example, the printing device may indicate which settings from the print queue cannot be customized. The printing device may then provide an option to the user to proceed without customizing the settings that are unavailable. At block 310, the method 300 ends.

Figure 4:
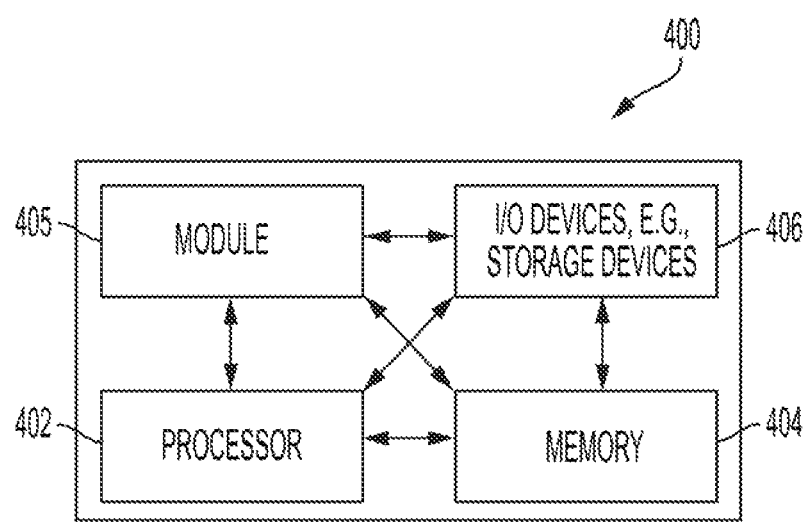
FIG. 4 illustrates a high-level block diagram of an example computer suitable for use in performing the functions described herein.

FIG. 4 depicts a high-level block diagram of a computer that is dedicated to perform the functions described herein. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for generating a machine readable code for a print queue, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for generating a machine readable code for a print queue (e.g., a software program comprising computer-executable instructions) can be loaded into memory 404 and executed by hardware processor element 402 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for generating a machine readable code for a print queue (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A printing device, comprising:
a processor; and
a non-transitory computer readable medium storing instructions which, when executed by the processor, cause the processor to:
receive selections for settings of a print job for a particular model number of the printing device;
save the selections as a print queue; and
generate a machine readable code that contains the selections for the print queue of the particular model number of the printing device to enable other printing devices with the particular model number to load the selections for the settings on the other printing devices and execute the print queue using the settings contained in the machine readable code.

2. The printing device of claim 1, wherein the selections for settings of the print job comprise at least one of: a paper size, color values, a brightness, a contrast, or a size adjustment.

3. The printing device of claim 1, wherein the machine readable code comprises a bar code or a quick response (QR) code.

4. The printing device of claim 1, wherein the instructions which cause the processor to generate the machine readable code comprise instructions to print the machine readable code.

5. The printing device of claim 1, wherein the instructions which cause the processor to generate the machine readable code comprise instructions to cause the processor to:
create an email with the machine readable code included as an attachment; and
transmit the email with the machine readable code to a user.

6. The printing device of claim 1, wherein the instructions which cause the processor to generate the machine readable code comprise instructions to cause the processor to:
display the machine readable code on a display of the printing device to allow a user to capture an image of the machine readable code.

7. The printing device of claim 1, further comprising:
an optical scanner to scan the machine readable code.

8. The printing device of claim 7, wherein the instructions further cause the processor to:
read the selections for the print queue contained in the machine readable code that is scanned; and
set the selections on the printing device for the print job.

9. The printing device of claim 1, further comprising:
a virtual print queue generator to allow a user to generate virtual print queues via a user interface of the printing device.

10. The printing device of claim 9, wherein the print queue comprises a virtual print queue, and the machine readable code contains selections for the virtual print queue.

11. A method, comprising:
- receiving, via a processor of a printing device, selections for settings of a print job for a particular model number of the printing device;
- saving, via the processor, the selections as a print queue; and
- generating, via the processor, a machine readable code that contains the selections for the print queue of the particular model number of the printing device to enable other printing devices with the particular model number to load the selections for the settings on the other printing devices and execute the print queue using the settings contained in the machine readable code.

12. The method of claim 11, wherein the selections for settings of the print job comprise at least one of: a paper size, color values, a brightness, a contrast, or a size adjustment.

13. The method of claim 11, wherein the machine readable code comprises a bar code or a quick response (QR) code.

14. The method of claim 11, wherein the generating comprises:
- printing the machine readable code.

15. The method of claim 11, wherein the generating comprises:
- creating, via the processor, an email with the machine readable code included as an attachment; and
- transmitting, via the processor, the email with the machine readable code to a user.

16. The method of claim 11, wherein the generating comprises:
- displaying, via the processor, the machine readable code on a display of the printing device to allow a user to capture an image of the machine readable code.

17. The method of claim 11, further comprising:
- causing, by the processor, an optical scanner to scan the machine readable code;
- reading, via the processor, the selections for the print queue contained in the machine readable code that is scanned; and
- setting, via the processor, the selections on the printing device for the print job.

18. The method of claim 11, wherein the print queue comprises a virtual print queue.

19. The method of claim 18, wherein the machine readable code contains the selections for the virtual print queue.

* * * * *